United States Patent
Chiang

(10) Patent No.: US 9,134,001 B2
(45) Date of Patent: Sep. 15, 2015

(54) VEHICLE LAMP COLOR-CHANGING DEVICE WITH SWINGABLE ARM

(71) Applicant: Nan-Hsin Chiang, Siansi Township, Changhua County (TW)

(72) Inventor: Nan-Hsin Chiang, Siansi Township, Changhua County (TW)

( * ) Notice: Subject to any disclaimer, the term of this patent is extended or adjusted under 35 U.S.C. 154(b) by 71 days.

(21) Appl. No.: 14/191,075

(22) Filed: Feb. 26, 2014

(65) Prior Publication Data
US 2015/0167915 A1    Jun. 18, 2015

(30) Foreign Application Priority Data
Dec. 12, 2013 (TW) .............................. 102223481 U

(51) Int. Cl.
*F21S 8/10* (2006.01)
*B60Q 3/00* (2006.01)

(52) U.S. Cl.
CPC .............. *F21S 48/1721* (2013.01); *B60Q 3/001* (2013.01); *F21S 48/1131* (2013.01); *F21S 48/1225* (2013.01); *F21S 48/1778* (2013.01); *F21S 48/2206* (2013.01)

(58) Field of Classification Search
CPC .............. F21S 48/1131; F21S 48/2206; F21S 48/1721; F21S 48/1225; F21S 48/1778; F21S 48/1208; F21S 48/1216; F21S 48/1715; F21S 48/1726; F21S 48/2212; F21S 48/2218; F21S 10/02; F21V 13/08; F21V 13/14; F21V 17/02; F21V 14/08; F21V 9/00; B60Q 3/0293; B60Q 3/001
See application file for complete search history.

(56) References Cited

U.S. PATENT DOCUMENTS 8,777,454 B2 * 7/2014 Yen ................................ 362/280
2014/0301084 A1 * 10/2014 Yen ................................ 362/284

FOREIGN PATENT DOCUMENTS

TW    M461734    9/2013

* cited by examiner

*Primary Examiner* — Bao Q Truong
(74) *Attorney, Agent, or Firm* — Muncy, Geissler, Olds & Lowe, P.C.

(57) ABSTRACT

A vehicle lamp color-changing device includes a bracket, a swinging unit mounted to the bracket and swingable about an imaginary axis, and a rotary driving unit. The swinging unit includes a colored lens and an eccentric member disposed offset from the imaginary axis. The rotary driving unit has a rotary drive mounted to the bracket, a swingable arm connected with the rotary drive, and a pulling rod connected with the swingable arm and the eccentric member pivotally. In this way, the swingable arm is drivenable by the rotary drive to drive the pulling rod to move the eccentric member and thereby cause the swinging unit to swing in a way that the colored lens is swingable between an active position and an inactive position. As a result, the vehicle lamp color-changing device responds fast and is small-sized so as to be easily arranged in the vehicle lamp.

10 Claims, 4 Drawing Sheets ately lager angle. Therefore, the vehicle lamp color-changing device responds fast and the rotary drive can be provided with relatively smaller torque output so that the rotary drive is relatively small-sized and thereby easily arranged in the vehicle lamp. If a servomotor or other equivalent apparatuses is used in the present invention to serve as the rotary drive, the angular position and velocity of the colored lens can be controlled accurately to prevent the colored lens from making noises and being damaged.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

VEHICLE LAMP COLOR-CHANGING DEVICE WITH SWINGABLE ARM

BACKGROUND OF THE INVENTION

1. Field of the Invention

The present invention relates generally to vehicle lamp color-changing devices and more particularly, to a vehicle lamp color-changing device with a swingable arm.

2. Description of the Related Art

Taiwan Patent No. M461734 disclosed a rotary color-temperature-changing device for a lamp, which comprises a base for installation of a light source, a rotary mechanism installed on the base, and a colored lens attached to and driven by the rotary mechanism so that the color of lights emitted by the lamp is changeable by rotation of the colored lens. That is, the light color of the lamp is either the original light color of the light source or the color of light from the light source after projecting through the colored lens and thereby being changed in color temperature thereof.

However, for the purpose of spacial arrangement, the aforesaid rotary color-temperature-changing device for a lamp uses a set of bevel gears for transmission between a motor and the colored lens, resulting in slow response and a requirement of relatively larger torque outputted by the motor so that the motor correspondingly has a relatively larger size and causes further difficulties in spacial arrangement. Besides, a technical problem in designing the aforesaid device is liable to happen; that is, if the angular position of the colored lens is changed very often and fast, the colored lens is likely to bump against other elements, thereby making noises and/or possibly damaging the colored lens.

SUMMARY OF THE INVENTION

The present invention has been accomplished in view of the above-noted circumstances. It is an objective of the present invention to provide a vehicle lamp color-changing device which is adapted to be installed in a vehicle lamp so that light color of the vehicle lamp is selectable between two specific colors. Besides, the vehicle lamp color-changing device responds fast and is small-sized so as to be easily arranged in the vehicle lamp.

To attain the above objective, the present invention provides a vehicle lamp color-changing device which comprises a bracket, a swinging unit and a rotary driving unit. The swinging unit is mounted to the bracket and swingable about an imaginary axis by means of at least a pivot. The swinging unit comprises a colored lens and an eccentric member disposed offset from the imaginary axis. The rotary driving unit comprises a rotary drive mounted to the bracket, a swingable arm connected with the rotary drive, and a pulling rod pivotally connected with the swingable arm and the eccentric member. The swingable arm is drivenable by the rotary drive to drive the pulling rod to move the eccentric member in a way that the colored lens is swingable between an active position and an inactive position.

The vehicle lamp color-changing device is adapted to be installed in a vehicle lamp in a way that the bracket is fixed to a base of the vehicle lamp and the colored lens faces a light source of the vehicle lamp when located at the active position but doesn't face the light source when located at the inactive position. In this way, a user can select light color of the vehicle lamp between two specific colors by switching the angular position of the colored lens. Besides, when the swingable arm is driven by the rotary drive to swivel through a relatively smaller angle, the swinging unit is driven to swing through a relatively lager angle. Therefore, the vehicle lamp color-changing device responds fast and the rotary drive can be provided with relatively smaller torque output so that the rotary drive is relatively small-sized and thereby easily arranged in the vehicle lamp. If a servomotor or other equivalent apparatuses is used in the present invention to serve as the rotary drive, the angular position and velocity of the colored lens can be controlled accurately to prevent the colored lens from making noises and being damaged.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
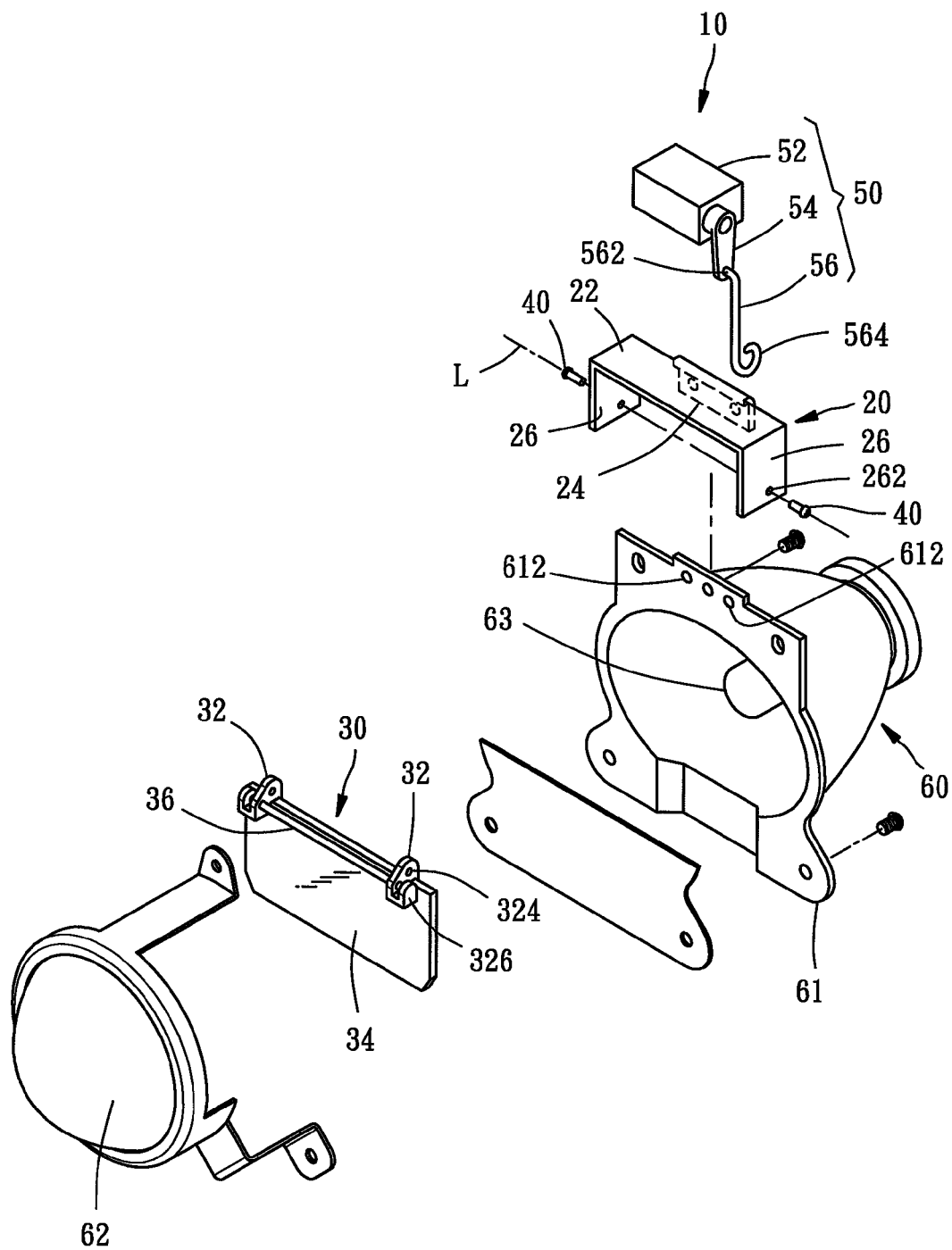
FIG. 1 is an exploded perspective view of a vehicle lamp color-changing device according to a preferred embodiment of the present invention.
Figure 2:
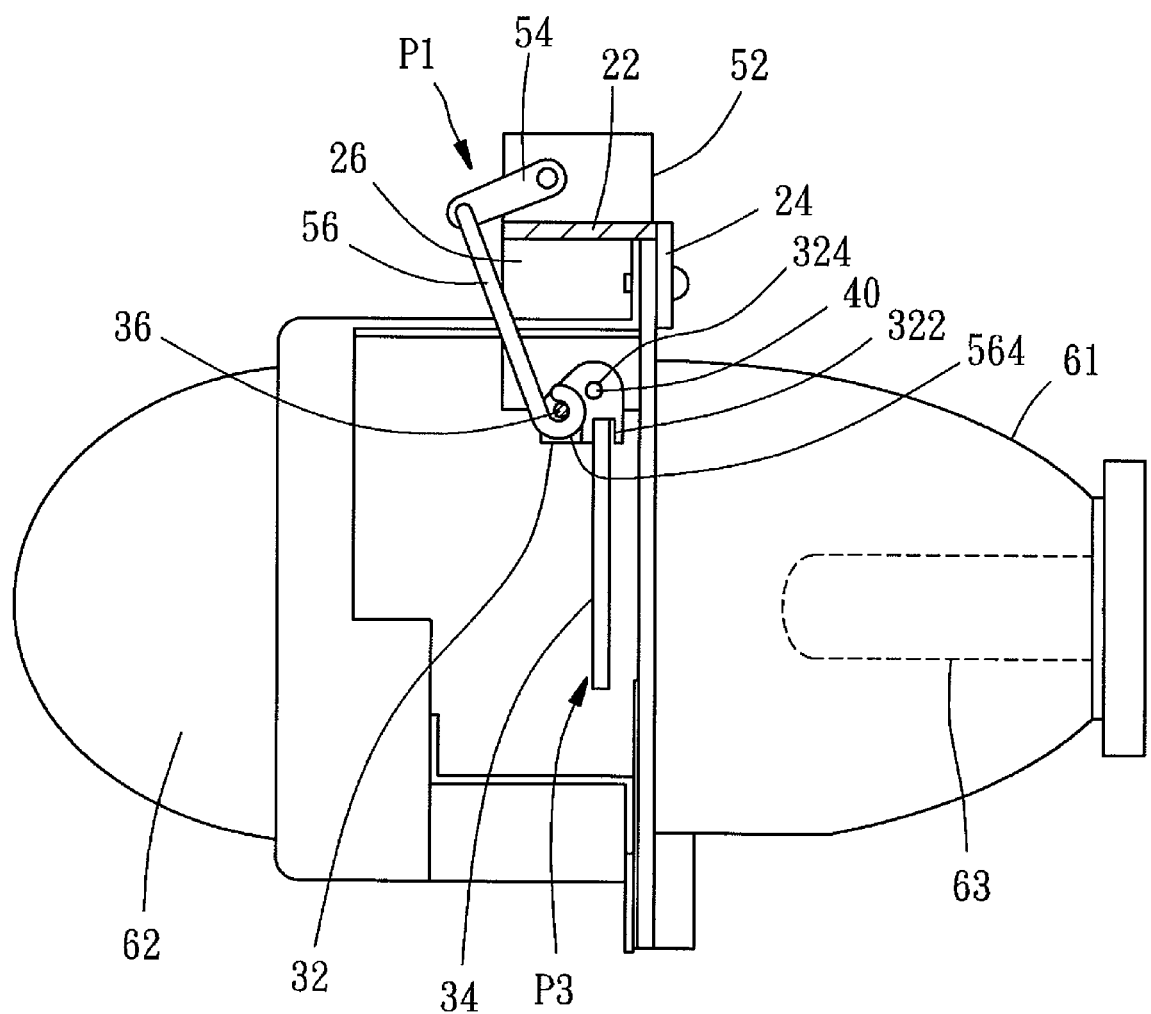
FIG. 2 is a lateral and partially sectional view of the vehicle lamp color-changing device of the preferred embodiment of the present invention, wherein a colored lens is located at an active position.
Figure 3:
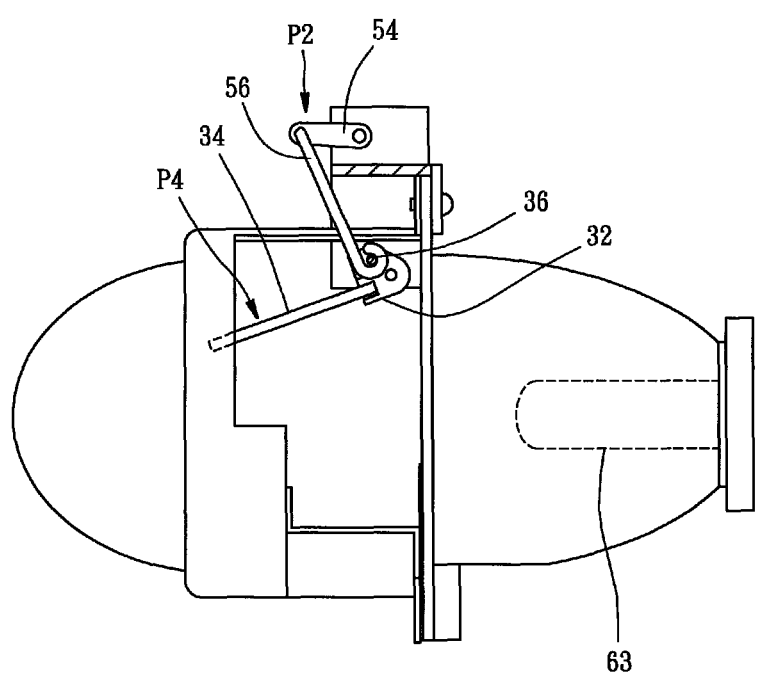
FIG. 3 is similar to FIG. 2, but showing that the colored lens is located at an inactive position.
Figure 4:
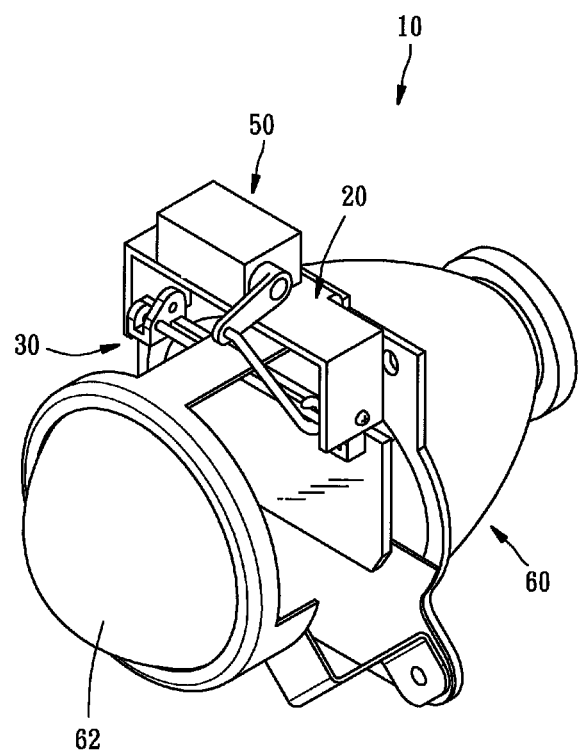
FIG. 4 is an assembled perspective view of the vehicle lamp color-changing device of the preferred embodiment of the present invention, wherein the colored lens is located at the active position.

Referring to FIGS. 1-4, a vehicle lamp color-changing device 10 according to a preferred embodiment of the present invention comprises a bracket 20, a swinging unit 30, two pivots 40, and a rotary driving unit 50. The vehicle lamp color-changing device 10 is adapted to be installed in a vehicle lamp 60 and disposed between a base 61 and a lens 62 of the vehicle lamp 60. A light source 63 such as a bulb is disposed in the base 61 and emits lights toward the lens 62.

The bracket 20 has a tabulate supporting portion 22 disposed on a top of the base 61, a tabulate fastening portion 24 and two tabulate pivotal connecting portions 26 extending from the supporting portion 22 toward a same direction (downward in this embodiment). The fastening portion 24 is fastened to the base 61 by means of two screws (not shown) that are threadedly fixed in two fastening holes 612. Each of the pivotal connecting portions 26 has a threaded hole 262.

The swinging unit 30 comprises two holders 32, a colored lens 34 and a rod-shaped eccentric member 36. Each of the holders 32 has a slot 322, a pivotal connecting hole 324 located above the slot 322, and a sleeve portion 326 located by a side of the slot 322. The colored lens 34 is fixedly embedded in the slots 322 of the holders 32. The eccentric member 36 is disposed between the holders 32 in a way that two ends of the eccentric member 36 are inserted into the sleeve portions 326 of the holders 32, respectively.

The holders 32 are disposed between the pivotal connecting portions 26 of the bracket 20 and respectively connected with the pivotal connecting portions 26 by the pivots 40 respectively penetrating through the pivotal connecting portions 26 and passing through the pivotal connecting holes 324 of the holders 32. In this way, the swinging unit 30 is mounted to the bracket 20 and swingable about an imaginary axis L and the eccentric member 36 is offset from the imaginary axis L.

In this embodiment, each of the pivots 40 is a screw threadedly fixed in the threaded hole 262 of the pivotal connecting portion 26 and passing through the pivotal connecting hole 324 of the holder 32. In this way, the swinging unit 30 is easily connected with the bracket 20 pivotably and meanwhile the pivots 40 are fixed to the bracket 20. However, how the swinging unit 30 is connected with the bracket 20 pivotably is not limited to the way provided in this embodiment.

The rotary driving unit 50 comprises a rotary drive 52, a swingable arm 54 and a pulling rod 56. The rotary drive 52, which is a servomotor in this embodiment, is fixedly disposed on the supporting portion 22 of the bracket 20. An end of the swingable arm 54 is fixedly connected with an output shaft (not shown) of the rotary drive 52. The other end of the swingable arm 54 is pivotally connected with a first end of the pulling rod 56.

In this embodiment, the pulling rod 56 is provided at the first end thereof with a shaft 562 and at a second end with a ring 564. The shaft 562 is pivotally inserted into the swingable arm 54. The ring 564 is pivotally sleeved onto the eccentric member 36. However, the configuration design of the pulling rod 56 is not limited to that described here, as long as said two ends of the pulling rod 56 can be pivotally connected with the swingable arm 54 and the eccentric member 36, respectively.

A four-bar linkage composed of the bracket 20, the swingable arm 54, the pulling rod 56 and the swinging unit 30 is provided in the present invention. In this four-bar linkage, the swingable arm 54 is drivenable by the rotary drive 52 to swivel between a first angular position P1 and a second angular position P2 so as to drive the swinging unit 30 through the pulling rod 56. When the swingable arm 54 is located at the first angular position P1, the colored lens 34 is located at an active position P3; at this time, the colored lens 34 extends from the holders 32 downward and faces the light source 63 of the vehicle lamp 60. When the swingable arm 54 swivels from the first angular position P1 to the second angular position P2, the pulling rod 56 drives the eccentric member 36 to move upward, causing the swinging unit 30 to swing about the imaginary axis L toward the lens 62; at the same time, the colored lens 34 swings from the active position P3 to an inactive position P4 where the colored lens 34 doesn't face the light source 63.

The vehicle lamp color-changing device 10 is adapted for being used by a user to switch the angular position of the colored lens 34. When the colored lens 34 is located at the inactive position P4, the light color of the vehicle lamp 60 is the original light color of the light source 63. When the colored lens 34 is located at the active position P3, lights from the light source 63 will be changed in color temperature thereof after projecting through the colored lens 34, causing the light color of the vehicle lamp 60 to become a different color from the original light color of the light source 63. In general, the light source 63 of the vehicle lamp 60 emits white lights and the colored lens 34 will transfer white lights emitted by the light source 63 to yellow lights if the colored lens 34 is coated with yellow color and faces the light source 63.

It will be appreciated that the rotary drive 52 is not limited to the servomotor, but can also be an ordinary rotary motor for instance, as long as the swingable arm 54 is drivenable by the rotary drive 52 and thereby capable of reciprocally swinging between the first angular position P1 and the second angular position P2. However, inside the servomotor, not only a rotary motor but also an angular sensor, an electrical controller and a reduction gear train are built, resulting in accurate control of the angular position of the colored lens 34 and thereby preventing the colored lens 34 from bumping against other elements and being damaged. Besides, the rotary motor equipped in the servomotor can be provided with small power output and raised its torque by the reduction gear train to afford the aforesaid driving process. By means of the reduction gear train, the swinging velocity of the colored lens 34 can be lowered appropriately to avoid making too loud noises. Therefore, using the servomotor to serve as the rotary drive 52 is a relatively better design.

No matter the rotary drive 52 is a servomotor or not, when the swingable arm 54 is driven to swivel through a relatively smaller angle, the swinging unit 30 is driven to swing through a relatively lager angle. Besides, the rotary driving unit 50 exerts a driving force at the eccentric member 36, arising a lever arm between the eccentric member 36 and the imaginary axis L. Therefore, the rotary drive 52 can be provided with relatively smaller torque output and a relatively smaller size corresponsively. As a result, the vehicle lamp color-changing device 10 not only responds fast but also can be small-sized and thereby easily arranged in the vehicle lamp.

In the aforesaid embodiment, the vehicle lamp color-changing device 10 is disposed on the top of the base 61 and the colored lens 34 is located under the bracket 20. However, the position and posture of the vehicle lamp color-changing device 10 are not limited to those described here, as long as the light color of the vehicle lamp can be switched by means of the device 10. For example, the vehicle lamp color-changing device 10 can be disposed at a bottom of the base 61 with inverted posture from the posture in the aforesaid embodiment; that is, the colored lens 34 is located above the bracket 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle lamp color-changing device comprising:
   a bracket;
   a swinging unit mounted to the bracket and swingable about an imaginary axis by at least one pivot, and having a colored lens and an eccentric member disposed offset from the imaginary axis; and
   a rotary driving unit having a rotary drive mounted to the bracket, a swingable arm connected with the rotary drive, and a pulling rod pivotally connected with the swingable arm;
   wherein the pulling rod is connected with the eccentric member pivotally; the swingable arm is drivenable by the rotary drive to drive the pulling rod to move the eccentric member in a way that the colored lens is swingable between an active position and an inactive position.

2. The vehicle lamp color-changing device as claimed in claim 1, wherein the rotary drive is a servomotor.

3. The vehicle lamp color-changing device as claimed in claim 1, wherein the pulling rod has a first end configured having a shaft, and a second end configured having a ring; the shaft is inserted into the swingable arm; the ring is sleeved onto the eccentric member.

4. The vehicle lamp color-changing device as claimed in claim 1, wherein the swinging unit further comprises two holders; the colored lens is fixed to the holders; the eccentric member is disposed between the holders; the bracket has two pivotal connecting portions; the holders are disposed between the pivotal connecting portions and connected with the pivotal connecting portions by two said pivots, respectively.

5. The vehicle lamp color-changing device as claimed in claim 4, wherein each of the pivots is a screw.

6. The vehicle lamp color-changing device as claimed in claim 5, wherein the pulling rod has a first end configured having a shaft, and a second end configured having a ring; the shaft is inserted into the swingable arm; the ring is sleeved onto the eccentric member.

7. The vehicle lamp color-changing device as claimed in claim 1, wherein the bracket has a supporting portion and two pivotal connecting portions extending from the supporting portion toward a same direction; the rotary drive is mounted on the supporting portion; the swinging unit is disposed between the pivotal connecting portions and pivotally connected with the pivotal connecting portions.

8. The vehicle lamp color-changing device as claimed in claim 7, wherein the swinging unit further comprises two holders; the colored lens is fixed to the holders; the eccentric member is disposed between the holders; the holders are connected with the pivotal connecting portions by two said pivots, respectively.

9. The vehicle lamp color-changing device as claimed in claim 8, wherein each of the pivots is a screw.

10. The vehicle lamp color-changing device as claimed in claim 9, wherein the pulling rod has a first end configured having a shaft, and a second end configured having a ring; the shaft is inserted into the swingable arm; the ring is sleeved onto the eccentric member.

* * * * *